US011760180B2

(12) United States Patent
Dupper

(10) Patent No.: US 11,760,180 B2
(45) Date of Patent: Sep. 19, 2023

(54) BATTERY HOUSING FOR A VEHICLE BATTERY

(71) Applicant: VOLKSWAGEN AKTIENGESELLSCHAFT, Wolfsburg (DE)

(72) Inventor: Denis Dupper, Gifhorn (DE)

(73) Assignee: Volkswagen Aktiengesellschaft ( * ) Notice: Subject to any disclaimer, the term of this patent is extended or adjusted under 35 U.S.C. 154(b) by 283 days.

(21) Appl. No.: 16/934,194

(22) Filed: Jul. 21, 2020

(65) Prior Publication Data
US 2021/0023926 A1 Jan. 28, 2021

(30) Foreign Application Priority Data

Jul. 22, 2019 (DE) ..................... 10 2019 210 790.7

(51) Int. Cl.
B60K 1/04 (2019.01)
H01M 50/24 (2021.01)
H01M 50/20 (2021.01)

(52) U.S. Cl.
CPC ............. B60K 1/04 (2013.01); H01M 50/20 (2021.01); H01M 50/24 (2021.01); H01M 2220/20 (2013.01)

(58) Field of Classification Search
None
See application file for complete search history.

(56) References Cited

U.S. PATENT DOCUMENTS

| 6,323,418 | B1 | 11/2001 | Tiburtius et al. | |
| 10,205,139 | B2 | 2/2019 | Wartenberg | |
| 10,371,181 | B1* | 8/2019 | Reibling | F16B 2/02 |
| 11,205,816 | B2 | 12/2021 | Günther | |
| 2010/0273040 | A1* | 10/2010 | Kubota | H01M 50/249 429/100 |
| 2011/0291437 | A1* | 12/2011 | Watou | B60J 10/35 156/244.18 |
| 2012/0164500 | A1* | 6/2012 | Loo | B60L 50/64 429/82 |
| 2014/0246259 | A1 | 9/2014 | Yamamura et al. | |
| 2015/0207119 | A1* | 7/2015 | Onodera | H01M 50/3425 429/89 |
| 2016/0149168 | A1 | 5/2016 | Butzmann et al. | |
| 2016/0293914 | A1* | 10/2016 | Miller | H01M 50/20 |

FOREIGN PATENT DOCUMENTS

| CN | 207818675 U | 9/2018 |
| CN | 109565006 A | 4/2019 |
| DE | 102012218188 A1 | 4/2014 |
| DE | 102012221751 A1 | 5/2014 |
| DE | 102013207872 A1 | 10/2014 |

(Continued)

Primary Examiner — Eli S Mekhlin
(74) Attorney, Agent, or Firm — BARNES & THORNBURG, LLP

(57) ABSTRACT

A battery casing for a transportation vehicle battery having a casing part with a peripheral sealing flange and a casing cover with a seal that extends around the periphery and seals a contact edge formed between the sealing flange and the casing cover, wherein a zero gap region is formed between the casing cover and the sealing flange radially outside with respect to the seal and a liquid seal is introduced into the zero gap region.

20 Claims, 4 Drawing Sheets

(56) References Cited

FOREIGN PATENT DOCUMENTS

| | | |
|---|---|---|
| DE | 102016107369 A1 | 10/2017 |
| DE | 102018211473 B3 | 9/2019 |
| JP | 2003168404 A | 6/2003 |
| JP | 2015230891 A | 12/2015 |
| JP | 2016527676 A | 9/2016 |
| JP | 2018037185 A | 3/2018 |
| KR | 19990077358 A | 10/1999 |
| KR | 20160019698 A | 2/2016 |
| KR | 20160082074 A | 7/2016 |

* cited by examiner

BATTERY HOUSING FOR A VEHICLE BATTERY

PRIORITY CLAIM

This patent application claims priority to German Patent Application No. 10 2019 210 790.7, filed 22 Jul. 2019, the disclosure of which is incorporated herein by reference in its entirety.

SUMMARY

Illustrative embodiments relate to a battery casing for a transportation vehicle battery, the battery casing comprising a casing part having a peripheral sealing flange, and a casing cover that comprises a seal that extends around the periphery and seals a contact edge that is formed between the sealing flange and the casing cover. Furthermore, illustrative embodiments relate to a method for producing such a battery casing, and to a transportation vehicle battery having such a battery casing, and to use of a fluid seal to provide protection against corrosion.

BRIEF DESCRIPTION OF THE DRAWINGS

Exemplary embodiments are further described below with the aid of the drawings. In the figures:

FIG. 6 illustrates a plan view of a section of the sealing flange with a liquid seal that is applied as a paste; and FIG. 7 illustrates a plan view of a section of the sealing flange with a liquid seal that is sprayed on.

DETAILED DESCRIPTION

Figure 1:
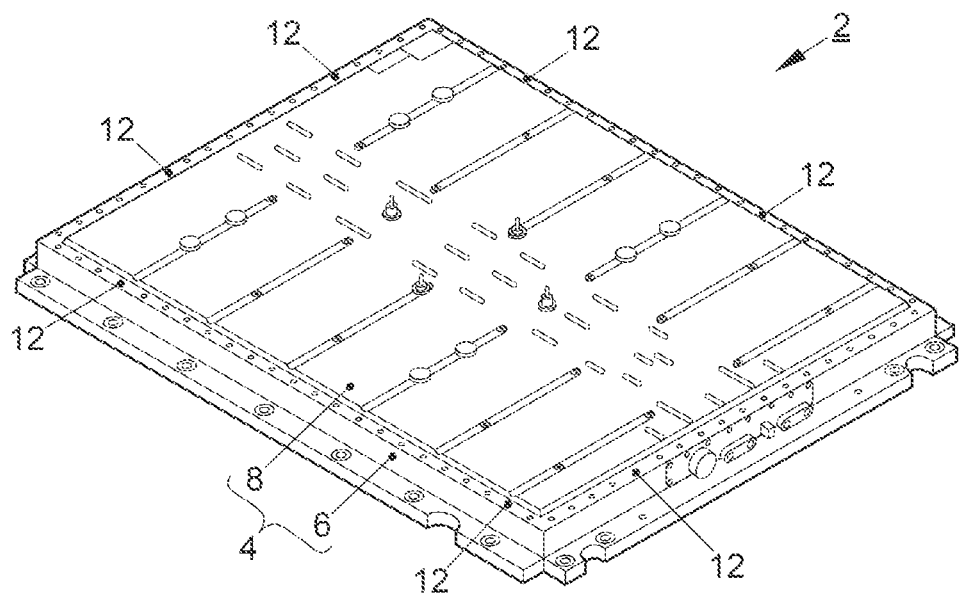
FIG. 1 illustrates a perspective view of a transportation vehicle battery with a battery casing.

Transportation vehicles that are driven or may be driven electrically or by an electric motor, such as, for example, electric vehicles or hybrid vehicles, generally comprise an electric motor by which one or both vehicle axles can be driven. To supply electrical energy, the electric motor is usually connected to an onboard (high voltage) battery as an electrical energy storage device.

An electrochemical battery is understood to mean here and below a so-called secondary battery (secondary battery) of the transportation vehicle. In the case of such a (secondary) vehicle battery, used chemical energy is recoverable by an electrical (re)charging procedure. Vehicle batteries of this type are embodied, for example, as electrochemical rechargeable batteries, in particular, as lithium ion rechargeable batteries. To generate or provide a sufficiently high operating voltage, such vehicle batteries typically comprise at least one battery module, in which case multiple individual battery cells are connected in a modular manner.

In this case, the battery cells or battery modules are typically accommodated in a battery casing of the vehicle battery. Battery casings of this type generally comprise a casing part having a peripheral sealing flange that can be closed by a casing cover. A seal that extends around the periphery is usually provided between the casing cover and the sealing flange, on the one hand the seal is to protect the casing interior, i.e., the battery cells or the battery module, to prevent the penetration of moisture and/or contaminants and on the other hand the seal is to prevent chemicals from escaping in the event of damage occurring to one or multiple battery cells. The necessary sealing pressure is realized in this case by screwing or riveting the casing cover and the sealing flange to one another.

The function of the seal of the battery casing is fundamentally to ensure the battery casing remains leak-tight over the service life of the vehicle battery or of the transportation vehicle. For this purpose, battery casings are usually tested and examined for leak-tightness using excess pressure and negative pressure after the assembly procedure.

Possible seals are, for example, molded seals produced from synthetic materials or rubber materials, for example, from EPDM (ethylene propylene diene rubber), NBR (acrylonitrile or nitrile butadiene rubber) or silicone foam. Molded seals of this type are typically produced as one-part, i.e., one-piece or monolithic molded parts that are arranged as an inlay seal between the casing cover and the sealing flange. In the case of larger battery casings, correspondingly larger dimensioned molded seals are required in this case, which makes the larger battery casings difficult to handle during the assembly procedure. This also results in a greater susceptibility to errors occurring during the assembly procedure.

It is likewise possible, for example, for a seal to be a sealing cord or sealing strip that is manufactured from an elastomer, in particular, from a silicone rubber. Sealing cords of this type do however require a comparatively large-area sealing flange as a support base, as a result of which the existing installation space for the battery cells within the battery casing is limited. In other words, by virtue of using a sealing cord, the energy capacity of the battery module or of the battery cells is reduced. Furthermore, it is also more difficult to handle sealing cords in the case of larger battery casings, with the result that the susceptibility to errors is greater during the assembly procedure.

Furthermore, for example, substance-to-substance adhesive seams, for example, produced from PU (polyurethane) adhesive, are also feasible as a casing seal. A "material closure" or a "substance-to-substance bond" between at least two mutually connected parts is understood to mean here and below that the mutually connected parts are held together at their contact surfaces by a material bonding or interlinking (for example, on the basis of atomic or molecular bonding forces), where appropriate under the influence of an additive.

During the course of the assembly procedure, adhesive seams of this type require comparatively long hardening times, as a result of which the duration of the production procedure for vehicle batteries of this type is extended. Furthermore, during the course of applying the adhesive to the casing cover and/or the sealing flange, adhesive seams of this type are vulnerable in the case of fluctuating process temperatures, such as room temperature, air moisture or surface quality of the surfaces receiving the adhesive. It is therefore necessary during the course of applying the adhesive to control and/or to regulate process parameters of this type, as a result of which the production costs of the battery casing are increased. Furthermore, adhesive seams of this type have the drawback that, during maintenance work or repair work on the vehicle battery, it is not possible to remove the adhesive seam in a non-destructive manner.

The casing cover and the casing part are attached to one another in the assembled state. Usually, the seal is arranged in this case in the region of a radially inner contact edge between the sealing flange and the casing cover, wherein the casing cover and the casing part lie one against the other radially outside with respect to the seal. This joining gap or this joining zone between the casing halves that lie one against the other is also described as a zero gap region.

A "zero gap region" is understood to mean here and below the technical zero gap between the casing halves, i.e., the remaining gap between the two casing halves that are to be joined together, and the zero gap region is described, for example, as a gap with a dimension of zero, although on account of manufacturing tolerances or uneven surfaces or rough surfaces it is possible, for example, for a residual gap with a dimension in the range of multiple micrometers to occur between the casing halves. In other words, the zero gap region is region between the casing halves in which the components would lie one against the other in a smooth or planar manner as far as the construction is concerned, i.e., directly and in a gap-free manner, if the contact surfaces of the components had not been manufactured with uneven surfaces or rough surfaces.

During the operation of the vehicle battery it is possible for an electrolyte, such as, for example, water, to penetrate into this zero gap region. Consequently, in the case of seals of the above-described type, there is the risk of so-called corrosive infiltration, in which case the electrolyte starting from the zero gap region attacks the surface of the sealing flange and/or of the casing cover and infiltrates the seal, as a result of which the seal is no longer able to provide the function of sealing the battery casing, and consequently undesired leakages can occur.

To avoid such corrosive infiltration, it is, for example, feasible to provide the seal as a permanently elastic seal. A permanently elastic seal is understood to mean, in this case in particular, a sealing compound that permanently has a putty-like, plastic consistency. In other words, such a permanently plastic sealing compound does not harden.

However, it is a drawback that permanently plastic seals of this type, that are also described below as liquid seals, require sealing surfaces that have been processed very precisely, i.e., the casing cover and the sealing flange must have a surface of high quality with few fluctuations in the manufacturing tolerance. Sealing surfaces of this type generally do not exist in the case of vehicle batteries since, for example, the casing covers are conventionally embodied as a deep-drawn component. this involves additional processing operations, such as, for example, milling and/or polishing the contact surfaces of the casing cover, as a result of which it would be considerably more complex and more cost-intensive to produce such a vehicle battery.

Disclosed embodiments provide a particularly suitable battery casing for a vehicle battery. The risk of corrosive infiltration of the (casing) seal is to be completely avoided or at least is to be considerably reduced. Disclosed embodiments also provide a particularly suitable method for producing such a battery casing and to propose a particularly suitable vehicle battery and a particularly suitable use of a liquid seal so as to provide corrosion protection.

The benefits and embodiments that are described with respect to the battery casing can also apply in an expedient manner to the method and/or the vehicle battery and/or use and conversely.

The disclosed battery casing is suitable and configured for a vehicle battery. The battery casing comprises in this case two casing halves that are joined together to form a closed casing. The first casing half is embodied as one case part (bottom shell) and comprises, for example, a number of battery compartments or receiving devices for battery cells. The casing part comprises a peripheral sealing flange. A sealing flange is understood to mean here and below an end-face or axial contact surface of the side walls of the casing part on which the second casing part lies at least in part. The second casing half is embodied in this case as a casing cover (battery cover, upper shell). The casing cover comprises a seal that extends around the periphery and this forms a leak-free and fluid-tight seal between the contact edge that is formed between sealing flange and the casing cover.

A zero gap region is formed radially outside with respect to the seal, i.e., away from the contact edge toward the exterior of the battery casing, the zero gap region being a region of a technical zero gap between the casing cover and the sealing flange. In accordance with the disclosure, a liquid seal is introduced into the zero gap region. This means that, in addition to the radially inner seal, a second seal that is arranged radially outside with respect to the radially inner seal is provided as a liquid seal. In this case, the liquid seal prevents electrolytes or water penetrating into the zero gap region, as a result of which the radially outside region in front of the seal is protected against corrosion.

The seal and liquid seal cooperate with one another as a battery casing sealing arrangement having the function of providing protection against corrosion, and this provides a reliable and operationally safe casing sealing arrangement, in particular, also for larger dimensioned battery casings. As a consequence, a particularly suitable, fluid-tight and leak-free battery casing is rendered possible, in which the risk of corrosive infiltration of the seal is reduced or completely avoided.

The disclosed combined use of the seal and the liquid seal produces a particularly suitable battery casing. The fluid seal prevents in a simple and outlay-reduced manner electrolytes from penetrating into the zero gap region with the result that the sealing effect of the seal is ensured essentially over the complete service life of the vehicle battery. The liquid seal is thus used essentially merely to protect the zero gap region against corrosion and not as a casing sealing arrangement for the battery casing. This renders it possible to reduce manufacturing tolerances of the casing halves since only the inner seal is essentially used for the sealing arrangement. Consequently, it is not necessary to provide additional and costly operations of processing the contact surfaces.

In this case, the seal is fluid-resistant and chemical-resistant, with the result that a reliable sealing arrangement to prevent the penetration of fluids and to prevent (battery) chemicals escaping is realized. In this case, the fluid seal is electrolyte-resistant or water-resistant and essentially acts to protect the casing surfaces that lie one against the other in the zero gap region against corrosion. In other words, the liquid seal is formed on the media contact with an electrolyte or with water. For example, the liquid seal is realized as a synthetic, permanently plastic sealing medium, such as, for example, Drei Bond 1108 [Three Bond 1108].

In at least one exemplary embodiment, the liquid seal essentially completely fills the zero gap region. As a consequence, it is ensured that electrolyte cannot penetrate into the zero gap region, whereby the risk of corrosive infiltration of the seal is essentially completely avoided.

The seal can be realized, for example, as a molded seal or a cord seal. In at least one disclosed embodiment, the seal is a foam seal, i.e., as a molded seal or seal seam, such as a foamed synthetic material. In this case, the seal is, for example, produced from a polyurethane or silicone foam. As a consequence, a seal is realized that is simple and cost-effective to produce.

In one feasible development, the casing cover is joined to the sealing flange in a non-positive manner at a number of attachment sites. As a consequence, the casing cover is attached to the casing part in a simple and outlay-reduced manner, whereby a reliable and operationally-safe sealing pressure is ensured for sealing the contact edge.

A "force fit" or a "non-positive connection" between at least two mutually connected parts are understood to mean here and below that a frictional force acting between the two parts prevents the mutually connected parts from sliding against one another. If a "connecting force" (this means the force which presses the parts against one another, for example, a screw force or the weight force itself) produced by this frictional force fails, the non-positive connection cannot be maintained and thus can become detached.

The casing cover and the sealing flange are pressed against one another or braced directly against one another by the attachment sites. In this case, the non-positive connection may be embodied as a screw connection. In this case, the casing cover comprises, for example, a number of cut-outs which are arranged axially aligned one above the other with threaded bore holes of the sealing flange, wherein in each case an attachment screw is guided through the cut-outs and rotated or screwed into the respective threaded bore hole.

The disclosed method is suitable and configured for producing a battery casing described above. In this case, in accordance with the method, in addition to the seal on the contact edge, a fluid seal is also applied in the zero gap region to the casing cover and/or to the sealing flange prior to the casing cover being joined to the sealing flange. The conjunction "and/or" is to be understood here and below in such a manner that the features that are linked by this conjunction can be embodied both jointly and also as alternatives to one another.

In at least one disclosed embodiment, a sprayable sealing medium is used, for example, as the fluid seal and the sprayable sealing medium may be applied over a surface area as a spray mist onto the casing cover and/or onto the sealing flange. A sprayable sealing medium is understood in this case to mean a sealing medium that can be atomized or can be distributed as an aerosol.

In at least one exemplary embodiment of the method, the liquid seal is applied as a paste-like, in particular, permanently plastic, sealing medium. A paste-like liquid seal of this type renders it possible to apply the liquid seal in an automated and time-reduced manner and—with respect to quantity and position—in a very precise manner. Furthermore, contaminants and contaminations consequently do not occur by a spray mist in the production of the battery casing, with the result that additional encapsulation of an application system is not required.

The liquid seal can be applied, for example, in a straight line onto the casing cover and/or onto the sealing flange. In one suitable development, the liquid seal is however applied in a caterpillar-like or meandering manner onto the casing cover and/or onto the sealing flange. As a consequence, it is ensured that the liquid seal is particularly uniformly distributed in the zero gap region.

In an exemplary embodiment of the method, the casing cover is joined to the sealing flange after the liquid seal has been applied. This means that the liquid seal is realized according to a FIP (formed in place) method, during which the liquid seal is applied as a liquid, and the casing halves are subsequently joined together. The liquid seal is therefore distributed in the zero gap region optionally during and/or after the casing halves being joined together. By virtue of joining or pressing the casing halves against one another, the flowing liquid seal is distributed essentially over the entire surface area in the zero gap region. This means that the contact surfaces of the casing cover and of the sealing flange are wetted essentially completely by the liquid seal, even if the liquid seal is only applied to one of the casing halves. As a consequence, it is possible to realize particularly reliable protection against corrosion so as to avoid corrosive infiltrations into the seal.

As a consequence, it is ensured that the liquid seal always fits in the zero gap region in an optimal manner since the liquid seal forms itself by virtue of the press-down pressure during the assembly procedure. After the liquid seal sets and hardens, a connection is produced between the casing cover and the sealing flange, the connection being particularly impermeable to electrolytes and being protected against corrosion.

In at least one exemplary embodiment, the battery casing is part of a vehicle battery of an electrically driven or electrically drivable transportation vehicle, in particular, an electric vehicle or hybrid vehicle. As a consequence, a particularly suitable and operationally safe and long-life vehicle battery is realized.

An additional exemplary embodiment provides for use of a liquid seal so as to provide corrosion protection of a zero gap region between a casing cover and a sealing flange of a casing part of a battery casing. The zero gap region is arranged radially outside with respect to a seal of the battery casing, with the result that, by virtue of the corrosion protection provided by the liquid seal, corrosive infiltration of the seal is prevented.

Parts and variables that correspond to one another are always provided in all the figures with identical reference numerals.

FIG. 1 illustrates a perspective view of a vehicle battery 2 for an electrically driven or electrically drivable transportation vehicle that is not further illustrated. In the installed state, the vehicle battery 2 is arranged in a battery installation space of the transportation vehicle. The battery installation space is, for example, open on the base-side and delimited by a vehicle subfloor. In other words, the vehicle battery can be mounted or installed from the underside of the transportation vehicle.

The vehicle battery 2 comprises a battery casing 4. A number of battery modules or battery cells, not further illustrated, are arranged and connected as electro-chemical energy storage devices in the battery casing 4. The battery casing 4 comprises a casing part 6 and a casing cover 8 that closes and covers the casing part. The casing cover 8 is, for example, a deep-drawn metal part.

The approximately rectangular casing part 6 comprises four side walls that stand up in an axial manner and encompass the interior of the battery casing 4. The casing cover 8 lies in this case essentially on the end face of these side walls, wherein the contact surfaces of the side walls which face the casing cover 8 are also described below as a sealing flange 10 (FIG. 3) of the casing part 6.

Figure 2:
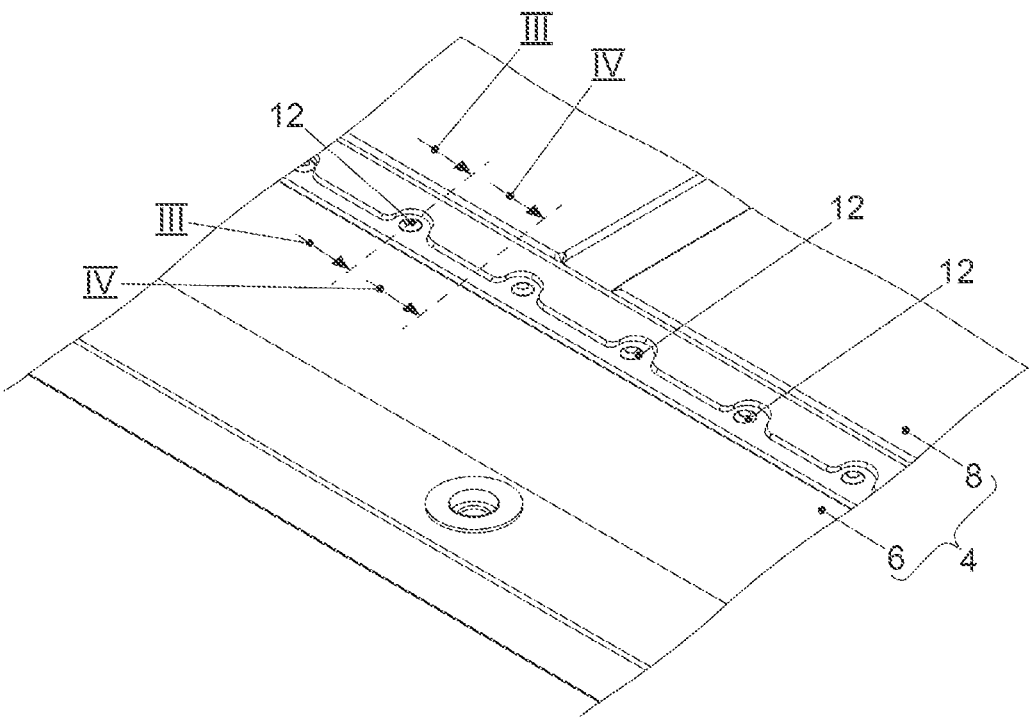
FIG. 2 illustrates a perspective view of a section of the battery casing.

As is apparent in the enlarged illustration of FIG. 2 of a section of the battery casing, the casing cover 8 is joined to the sealing flange 10 or to the casing part 6 in a non-positive manner at multiple attachment sites 12 that are distributed around the periphery. The attachment sites 12 are embodied, in this case in particular, as screw connections and are provided with reference numerals in the figures merely by way of example.

Figure 3:
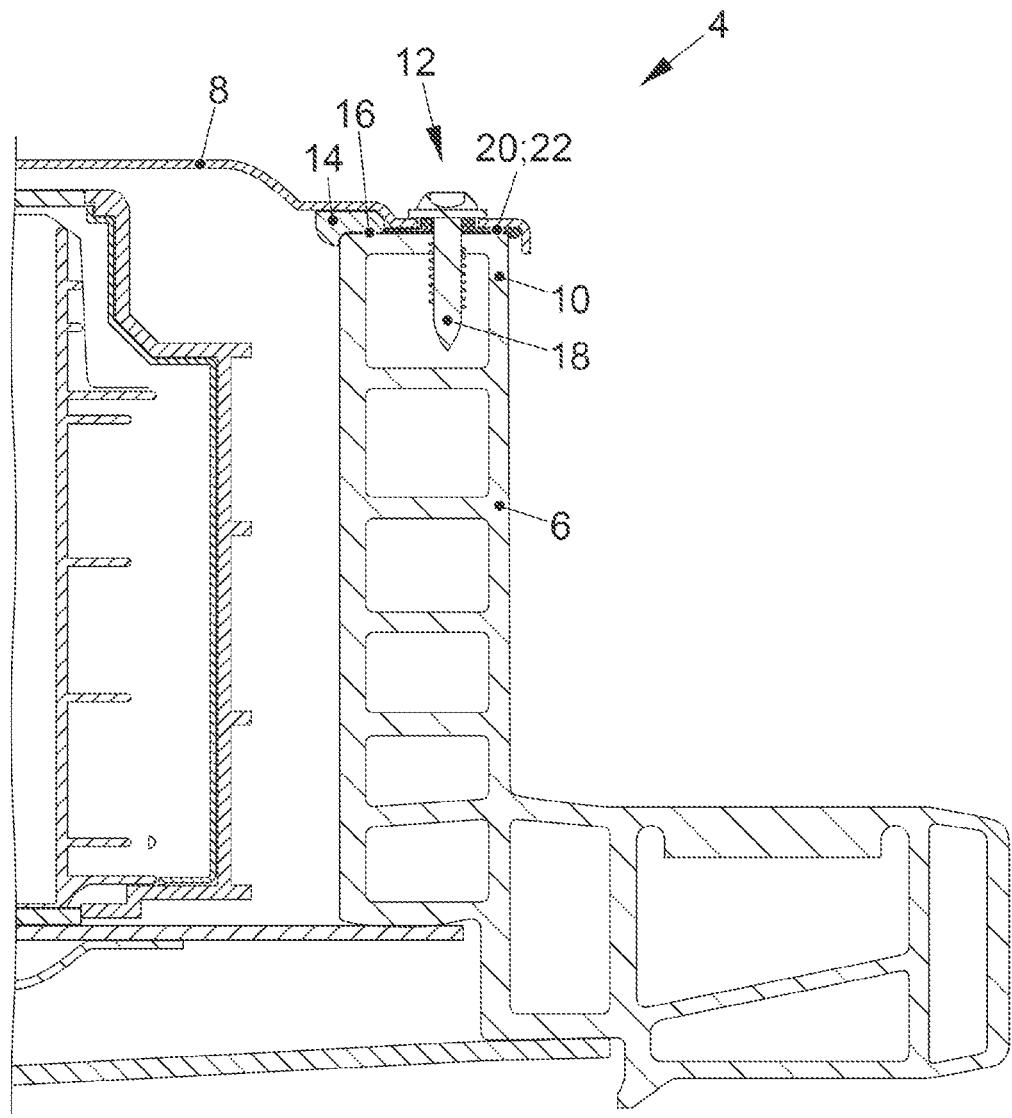
FIG. 3 illustrates a sectional view of the battery casing along the intersection III-III a shown in FIG. 2.
Figure 4:
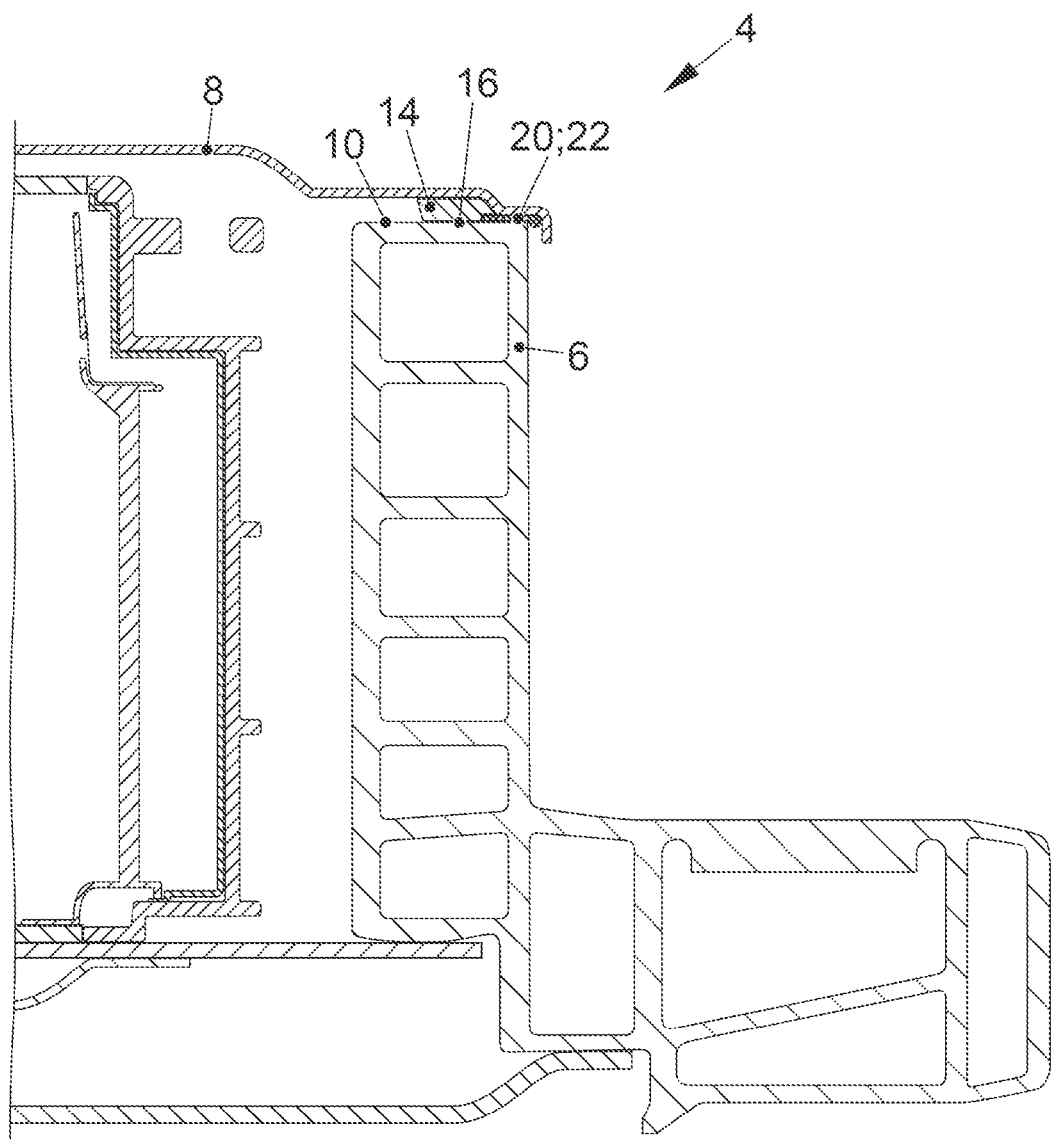
FIG. 4 illustrates a sectional view of the battery casing along the intersection IV-IV as shown in FIG. 2.

FIGS. 3 and 4 illustrate a sectional view of the battery casing 4 along the intersection III-III or IV-IV in accordance with FIG. 2. The intersection III-III extends in this case through the attachment site 12, wherein the intersection W-W is arranged between two attachment sites 12.

As is comparatively clearly apparent in the schematic and simplified illustrations of FIG. 3 and FIG. 4, the casing cover 6 comprises a seal 14 that extends around the periphery and seals in a leak-free and fluid-tight manner a contact edge 16 that is formed between the sealing flange 10 and the casing cover 6. The seal 14 is embodied, for example, as a foam seal, in particular, as a molded seal or a seal seam, such as a foamed synthetic material. The seal 14 is in this case, for example, produced from a polyurethane foam or a silicone foam and is sprayed onto the casing cover 8 using an injection molding process.

The seal 14 that extends around the edge is influenced with an axial sealing pressure by the attachment sites 12 and is compressed at least in part. The attachment sites 12 each comprise in this case an attachment screw 18 that passes through the casing cover 6 and the attachment screws are screwed into the sealing flange 10 or into the casing part 6.

A zero gap region 20 between the casing cover 6 and the sealing flange 10 is formed radially outside with respect to the seal 14 or with respect to the contact edge 16, thus with respect to the exterior of the battery casing 4. As is schematically illustrated in the figures, a liquid seal 22 is introduced into the zero gap region 20 and the liquid seal completely fills the zero gap region. The liquid seal 22 prevents electrolytes or water penetrating into the zero gap region 20, as a result of which the radially outside region in front of the seal 14 cannot be attacked by the electrolyte in a corrosive manner. The seal 14 and the liquid seal 22 cooperate with one another as a battery cover sealing arrangement which provides protection against corrosion.

The seal 14 is in this case produced from a fluid-resistant and chemical-resistant material, wherein the liquid seal 22 is produced from a particularly electrolyte-resistant, in particular, water-resistant, material.

A method for producing the battery casing 4 is further explained below with the aid of FIGS. 5 to 7.

Figure 5:
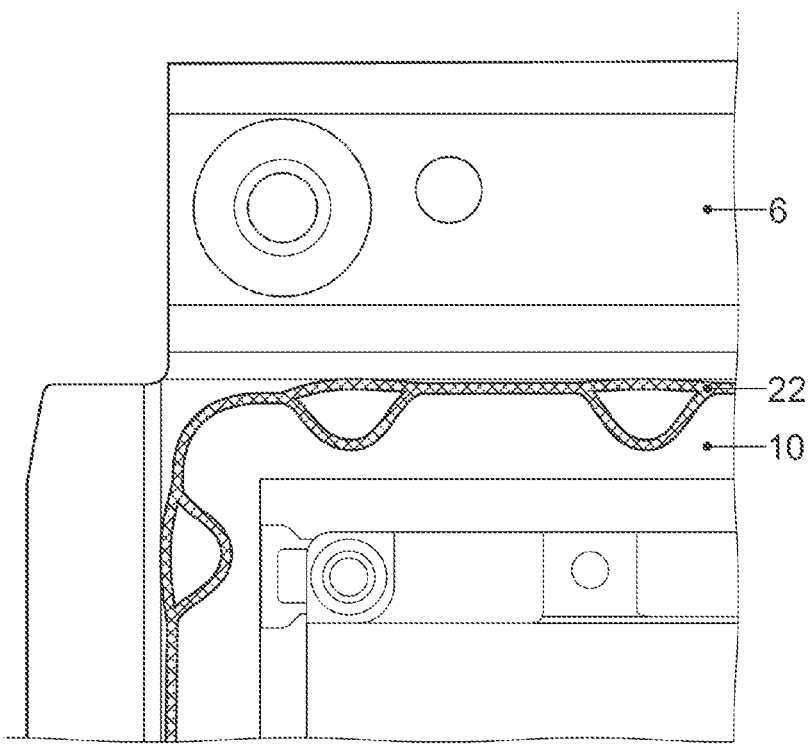
FIG. 5 illustrates a plan view of a section of the casing part of the battery casing with a sealing flange and a liquid seal that is applied thereto in a caterpillar-like manner.

In accordance with the method, the liquid seal 22 in this case is applied to the sealing flange 10 in the zero gap region 20 on the radial outside with respect to the seal 14 prior to the casing cover 8 being joined to the sealing flange 10 (FIG. 5). In addition or as an alternative thereto, it is likewise feasible, for example, that the liquid seal 22 is applied to the casing cover 8.

The casing cover 6 is attached by screws to the sealing flange 10 after the liquid seal 22 has been applied. This means that the liquid seal 22 is realized essentially according to an FIP (formed in place) method. As a consequence, it is ensured that the liquid seal 22 always fits in the zero gap region 20 in an optimal manner since the liquid seal forms itself by virtue of the press-down pressure during the assembly procedure. The liquid seal 22 is applied to the sealing flange 10 in this case appropriately in a caterpillar-like or meandering manner with the result that the zero gap region 20 is wetted and filled in as uniform a manner as possible as the casing cover 6 is pressed down or attached by screws onto the sealing flange 10. Thus, a connection that is particularly impermeable to electrolytes and protected against corrosion is produced in the zero gap region 22 between the casing cover 8 and the sealing flange 10.

Figures 6, 7:
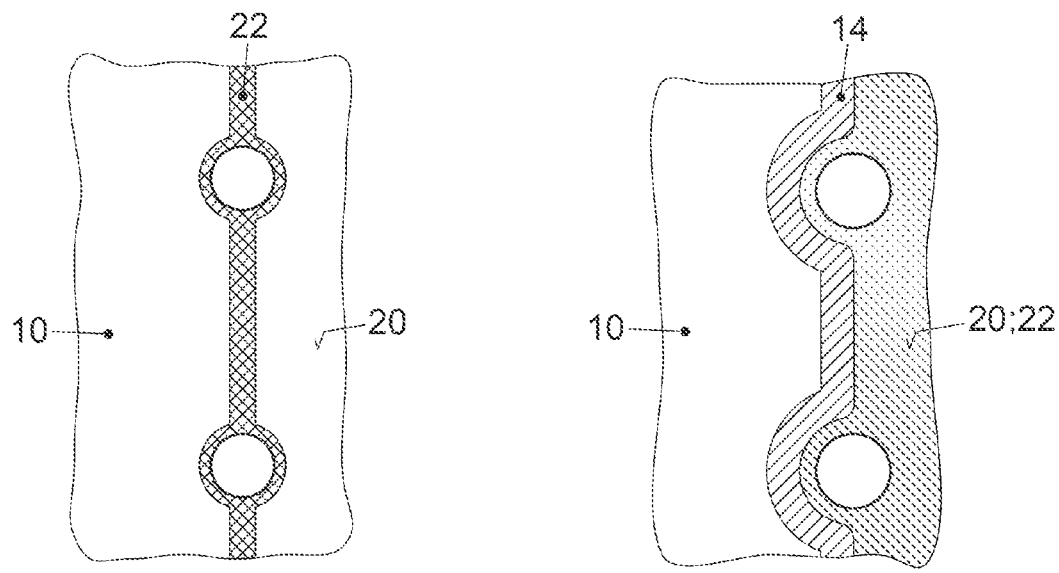

In FIG. 6, the liquid seal 22 is applied as a paste-like sealing medium. A paste-like liquid seal 22 of this type renders it possible to apply the liquid seal in an automated and time-reduced manner and—with respect to quantity and position—in a very precise manner.

The exemplary embodiment illustrated in FIG. 7 illustrates a liquid seal 22, such as a sealing medium that can be sprayed on and is applied over the surface area as a spray mist onto the sealing flange 10 in the zero gap region 20.

The disclosure is not limited to the above-described exemplary embodiments. On the contrary, a person skilled in the art can also derive therefrom other embodiments within the scope of the disclosed claims without abandoning the subject matter of the claimed disclosure. Moreover all individual features that are described in connection with the different exemplary embodiments can also be combined in a different manner within the scope of the disclosed claims without departing from the subject matter of the disclosure.

LIST OF REFERENCE NUMERALS

2 Transportation vehicle battery
4 Battery casing
6 Casing part
8 Casing cover
10 Sealing flange
12 Attachment site
14 Seal
16 Contact edge
18 Attachment screw
20 Zero gap region
22 Liquid seal

The invention claimed is:

1. A battery casing for a transportation vehicle battery, the battery casing comprising:
   a casing part having a peripheral sealing flange; and
   a casing cover that includes a seal extending peripherally around the casing cover to compressibly seal a contact edge formed between the sealing flange and the casing cover,
   wherein the casing cover and the sealing flange extend without engagement with each other radially inside with respect to the seal and a zero gap region is formed between the casing cover and the sealing flange radially outside with respect to the seal, and
   wherein a fluid seal is arranged at the zero gap region radially outside with respect to the seal.

2. The battery casing of claim 1, wherein the fluid seal fills the zero gap region.

3. The battery casing of claim 1, wherein the seal is a foam seal.

4. The battery casing of claim 1, wherein the casing cover is joined to the sealing flange at a plurality of attachment sites.

5. A method for producing the battery casing of claim 1, wherein the fluid seal is applied to the casing cover and/or to the sealing flange in the zero gap region prior to the casing cover being joined to the sealing flange.

6. The method of claim 5, wherein a paste sealing medium is applied as the fluid seal.

7. The method of claim 5, wherein the fluid seal is applied to the casing cover and/or to the sealing flange.

8. The method of claim 5, wherein the fluid seal is distributed into the zero gap region while the casing cover is being joined to the sealing flange.

9. A transportation vehicle battery of an electrically driven or electrically drivable transportation vehicle, the transportation vehicle battery comprising the battery casing of claim 1.

10. The battery casing of claim 1, wherein the seal is compressibly resilient for sealing between the casing part and the casing cover.

11. A method for providing corrosion protection for a zero gap region between a casing cover and a sealing flange of a casing part of a battery casing wherein the casing cover includes a seal extending peripherally around the casing cover to seal a contact edge formed between the sealing flange and the casing cover, wherein the casing cover and the sealing flange extend without engagement with each other radially inside with respect to the seal and a zero gap region is formed between the casing cover and the sealing flange radially outside with respect to the seal, and wherein a fluid seal is arranged at the zero gap region radially outside with respect to the seal.

12. The method of claim 11, wherein a paste sealing medium is applied as the fluid seal.

13. The method of claim 11, wherein the fluid seal is applied to the casing cover and/or to the sealing flange.

14. The method of claim 11, wherein the fluid seal is distributed into the zero gap region while the casing cover is being joined to the sealing flange.

15. The method of claim 11, wherein the fluid seal fills the zero gap region.

16. A battery casing for a transportation vehicle battery, the battery casing comprising:
a casing defining a peripheral sealing flange;
a casing cover including a seal extending along the sealing flange for engagement with the casing to enclose a seal gap formed between the sealing flange and the casing cover, wherein the casing cover and the sealing flange extend without engagement with each other radially in from the seal gap and the casing cover and the sealing flange define a zero gap region radially out from the seal gap, the zero gap region defining smaller spacing between the casing and the casing cover than the seal gap; and
a fluid seal arranged at the zero gap region radially out from the seal gap.

17. The battery casing of claim 16, wherein the seal fills the zero gap region.

18. The battery casing of claim 16, wherein the seal is a compressible seal.

19. The battery casing of claim 16, wherein the fluid seal is distributed into the zero gap region while the casing cover is being joined to the sealing flange.

20. The battery casing of claim 16, wherein the seal is compressibly resilient for sealing the seal gap.

* * * * *